United States Patent [19]

Yoshino

[11] 4,315,725
[45] Feb. 16, 1982

[54] JIG FOR ORIENTATION-BLOW MOLDING PIECE

[75] Inventor: Yataro Yoshino, Tokyo, Japan

[73] Assignee: Yoshino Kogyosho Co., Ltd., Tokyo, Japan

[21] Appl. No.: 160,382

[22] Filed: Jun. 17, 1980

[30] Foreign Application Priority Data

Jul. 10, 1979 [JP] Japan .................................. 54-87318

[51] Int. Cl.³ .......................... B29C 17/07; F29B 9/06
[52] U.S. Cl. .................................. 425/174.4; 219/354; 219/388; 264/25; 264/26; 264/532; 264/535; 425/174.8 R; 425/526
[58] Field of Search ...................... 425/174.4, 174.8 R, 425/526, 529; 264/25, 26, 535, 532; 219/364, 388

[56] References Cited

U.S. PATENT DOCUMENTS 4,233,010 11/1980 Sadaosuzuki .................. 425/526 X

FOREIGN PATENT DOCUMENTS

| 2193694 | 2/1974 | France ................................ 264/535 |
| 47-1118 | 12/1972 | Japan ................................ 425/526 |
| 49-32778 | 3/1974 | Japan ................................ 425/174.8 |
| 52-515 | 8/1977 | Japan ................................ 425/174.8 |
| 483917 | 2/1970 | Switzerland ....................... 425/526 |

*Primary Examiner*—Jan H. Silbaugh
*Attorney, Agent, or Firm*—Stevens, Davis, Miller & Mosher

[57] ABSTRACT

A jig used for a blow-molding machine for fabricating a bottle-shaped container of biaxially oriented plastic, which comprises advantageously a core shaft elevationally movably inserted in a mandrel and having a blow-molding air passage for longitudinally orienting the piece, and a heat insulating layer provided on the outer periphery of the core shaft for heating the piece upon irradiation of heat rays such as far infrared rays to thereby externally heat the piece and also internally heat the piece. Thus, the piece is uniformly heated in or immediately before the blow-molding of the piece so as to improve the molding accuracy of the piece into a bottle-shaped container in the blow molding mold.

5 Claims, 4 Drawing Figures

JIG FOR ORIENTATION-BLOW MOLDING PIECE

BACKGROUND OF THE INVENTION

The present invention relates to a blow-molding machine for fabricating a bottle-shaped container of biaxially oriented plastic material such as polyethylene terephthalate and, more particularly, to a jig used for the blow-molding machine.

When polyethylene terephthalate is biaxially oriented to fabricate a bottle-shaped container in an ordinary process for molding the container of biaxially oriented plastic material, it is maintained at a temperature suitable for orienting the material immediately before blow-molding the material. To this end, there has been previously proposed, in Japanese Patent Application No. 159,155/77 corresponding to U.S. Pat. Application Ser. No. 973,439, filed on Dec. 26, 1978, now U.S. Pat. No. 4,233,010, an apparatus for producing biaxially oriented plastic containers, which comprises a jig having a neck support for holding the neck of an injection-molded plastic piece of closed-end cylindrical shape to be formed into a bottle-shaped container, which piece will be hereinafter called the "piece". The piece is positioned upside down; a mandrel is formed beneath the neck support; and a core shaft for longitudinal orientation is provided inside the mandrel so as to be freely moved up or down and has a blow-molding air passage. The jig set with the piece is attached to a core metal which is moved in a heating chamber immediately before use of a blow-molding machine and is automatically operated while the jig is moved to substantially uniformly heat the piece by means of environmental infrared rays or far infrared rays.

However, when the piece is biaxially oriented to form larger bottle-shaped containers, it must be large and thick enough to form the large bottle-shaped container. As the piece is increased in size and thickness, it becomes difficult to uniformly heat the piece, particularly in its thickness direction, only by the external infrared ray or far infrared ray heating system. When the piece is abruptly heated in this case, it tends to be deformed, to form irregularly thick portions, or to retain its shrinkage to cause the bottle-shaped container thus blow-molded from the piece to be fabricated improperly. In order to avoid these drawbacks, it is necessary to gradually heat the piece sufficiently in uniform temperature distribution thereat.

SUMMARY OF THE INVENTION

Accordingly, a primary object of the present invention is to provide a jig used for a blow-molding machine for fabricating a bottle-shaped container of biaxially oriented plastic which eliminates the aforementioned drawbacks and disadvantages of the conventional jig.

It is another object of the present invention to provide a jig used for a blow-molding machine for fabricating a bottle-shaped container of biaxially oriented plastic which can produce the preferable container of high molding accuracy by supporting the injection-molded plastic piece of closed-end cylindrical shape and preferably uniformly heating the piece immediately before blow-molding the piece.

It is still another object of the present invention to provide a jig used for a blow-molding machine for fabricating a bottle-shaped container of biaxially oriented plastic which incorporates no irregular thickness nor shrinkage by internally heating the piece simultaneously upon external heating of the piece.

It is still another object of the invention to provide a jig used for a blow-molding machine for fabricating a bottle-shaped container of biaxially oriented plastic which can smoothly execute the attachment of the piece to a core metal, supply of the piece from a heating chamber to a blow-molding mold, biaxial orientation of the piece in the mold, and detachment of the piece from the mold, etc. to thereby fabricate the container of superior molding accuracy.

The present invention provides a jig used for blow-molding machine for fabricating a bottle-shaped container of biaxially oriented plastic, which comprises a core shaft heated by an induction heating coil disposed in a heating unit in the jig to heat the piece, and a heat insulating layer provided on the outer periphery of the core shaft for heating the piece upon irradiation of heat rays such as far infrared rays to thereby externally heat the piece by infrared rays or far infrared rays and also internally heat the piece so as to thereby uniformly heat the piece to thus improve the molding accuracy of the piece in the orientation blow-molding mold. The foregoing objects and other objects as well as the characteristic features of the invention will become more apparent and more readily understandable by the following description and the appended claims when read in conjunction with the accompanying drawings.

DESCRIPTION OF THE PREFERRED EMBODIMENTS

Figure 1:
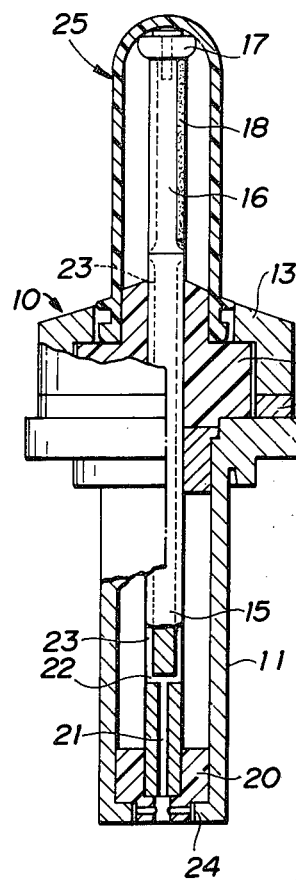
FIG. 1, is a partially broken front view of the jig attached with the piece of closed-end cylindrical shape to be blow-molded into a bottle-shaped container according to the present invention.
Figure 2:
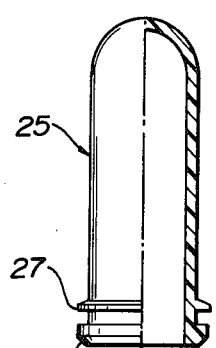
FIG. 2 is a front view of an injection-molded piece used for the jig in the present invention.

Referring now to the accompanying drawings, particularly to FIG. 1 illustrating the jig attached with the piece according to the present invention, wherein like reference numerals designate the same parts in the following views, a piece 25 to be formed into a bottle-shaped container is attached to a jig 10 of the present invention. The piece 25 employs such plastic materials, for example, polyethylene terephthalate, that have a high crystallizability and exhibit a thin-walled transparent and shockproof property by a biaxially orientation-blow molding process. The plastic material is injection-molded into a piece 25 of closed-end cylindrical shape. The piece 25 is preformed with a neck portion 26 with an opening formed thereat and also with a circular protrusion or flange 27 as more clearly seen in FIG. 2.

As shown in FIG. 1, the jig 10 essentially comprises a cylindrical mandrel 11, a disk 12 integrally formed at the top of the mandrel 11, a neck support 13 for supporting the neck portion 26 of the piece 25, a core guide 14 made of refractory synthetic resin such as fluoroethylene resin disposed in the neck support 13, and a core shaft 15 elevationally movably inserted into the mandrell 11 to allow upward and downward movement.

The neck support 13 has the function of supporting the outside of the neck portion 26 of the piece 25, and is disposed above a heat-insulating plate 19 provided on the top of the disk 12 of the mandrel 11. While, at the upper end of the core shaft 15, there is provided a core top 17 made of heat-insulating material (e.g. fluoroethylene resin) having an inverted taper shape (inverted frusto-conical shape) or spherical shape for stopping the heat conduction to and from the piece 25 and for preventing the piece 10 from sticking onto the core shaft 15 when it is subjected to the longitudinal orientation due to the elongation of the core shaft 15.

The core shaft 15 is preferably made of iron alloy so as to be heated to predetermined temperature such as, for example, 200° to 300° C. for a short time such as, for example 1 to 2 seconds, by a high frequency induction heater 36 in or immediately before a heating unit as will be hereinafter described in greater detail. The core is preferably coated by a heat-insulating layer 18 made, for example, of zirconium ceramic which is heated by heat rays of special wavelengths around the periphery of a small-diameter portion 16 at the protruded portion from the core guide 14 in FIG. 1. This heat insulating layer 18 is made of fibrous ceramic to eliminate the disadvantages caused by its brittleness against mechanical shock or impact. The core shaft 15 is also provided at its lower end with a nozzle holder 20 of piston shape which is fitted into the cylindrical mandrel 11. Inside the lower part of the core shaft 15, a hole of T-shape section is bored, and two air passages 23, 23 of spline shape extend in the outside surface of the shaft upwards from the opposite openings 22, 22 of the T-shape hole 21. The mandrel 11 is provided at its lower end with holes 24 in order that a cylinder rod (not shown) is protruded upwards into the mandrel 11 when the piece 25 is longitudinally oriented in the blow-molding mold.

Figure 3:
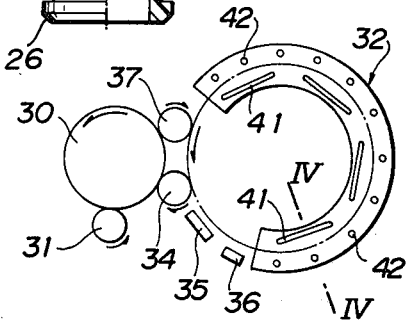
FIG. 3 is a plan view of a schematic blow-molding machine using the jig of the present invention.

FIG. 3 illustrates the schematic orientation blow-molding machine. Reference numeral 30 designates a fully automatic rotary blow-molding machine incorporating a plurality of molds attached onto a turntable, 31 an unloader for unloading a product or bottle-shaped container blow-molded by the blow-molding machine, 32 a heating unit, 33 a jig feeding unit for circulating the jigs within the heating unit, 34 a loader for loading jig from the mold of the completed blow-molding to a transfer unit, 35 a supply unit for supplying the piece to the jig, 36 a high frequency induction heater for heating the small-diameter portion 16 of the core shaft 15 of the piece 25, and 37 a loader for supplying the piece 25 thus heat treated and attached to the jig 10 to the mold.

Figure 4:
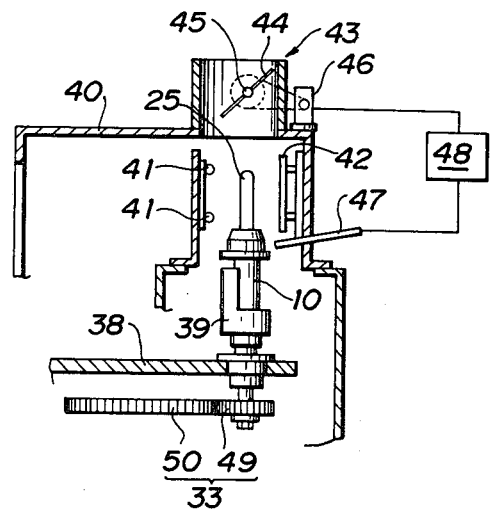
FIG. 4 is a longitudinal section of a heating apparatus used in the present invention taken along the line IV—IV in FIG. 3.

As shown in FIG. 4, the heating unit 32 comprises a rotary disk 38 on which a plurality of core metals 39 are attached along its peripheral edge and a cover 40 placed over it. The heating unit 32 is divided into a plurality of heating zones disposed along the transfer path of the core metals 39 covered by the cover 40 and can be individually controlled. In each heating zone, several bar heater elements comprising infrared ray or far infrared ray heating tubes 41, 41 are horizontally provided on the interior side of the transfer path of the core metals 39. While, on the exterior side of the transfer path, a plurality of infrared ray or far infrared ray heating tubes 42 are vertically disposed at suitable interval. A heat-exhausting damper unit 43 is provided on the upper side of the cover 40 at each heating zone. The shaft 45 of a damper 44 is associated with a driving device 46. The temperature of each heating zone of the heating unit is detected by a thermostat 47 which is electrically connected to a control unit 48. The control unit 48 generates an instruction to drive the driving device 46 for opening or closing each damper 44 depending upon the detected temperature so as to control the heating zone temperature to a preset temperature. The core metals 39 in the heating unit 32 are held at the peripheral portion of the disk 38. A pinion 49 provided at the lower end of the jig 10 is engaged with a gear 50. Thus, as the disk 38 turns, the gear 50 is rotated around the pinion 49 and around its own axis.

In the arrangment thus constructed, the jig 10, after loading the product or bottle-shaped container blow-molded, is transferred by the loader 34 to the jig feeding unit 33 (FIG. 4) and is attached to the core metal 39. Then, the piece 25 injection-molded is attached to the loader 35 to the jig 10 in an inverted neck portion position as shown in FIG. 1. The piece 25 is gravitationally inserted at its neck portion 26 between the neck support 13 of the jig 10 and the core guide 14. However, when gravity is insufficient, a depressing means (not shown) is provided at a position immediately succeeding to the transfer unit for lightly pushing down the piece 25 from above to ensure that its neck portion 26 is fitted in place onto the jig 10. The core metal 39 is rotated by the jig feeding unit 33 around the heating unit and its own axis. When the core metal 39 moves in the heating unit 32, the piece 25 supported by the jig 10 is internally heated by the heat from the core shaft 16 due to the high frequency induction heating and to the heat of the layer 18 by the irradiation of the far infrared ray heating tube, and is also externally heated by the heat of the infrared ray heating tube of the tubes 41, 42. The high frequency induction heating unit 36 disposed immediately after the supply unit 35, as shown in FIG. 3, inductively heats the small-diameter portion 16 of the core shaft 15. The core shaft 15 is heated, for example, to approx. 300° C. and for 2 seconds by the induction heating at 1.5 to 2.5 MHz, maintains at the same temperature for 30 minutes, is lowered to 100° C. after 50 minutes, and is further lowered to room temperature after 30 minutes by the Fe-W-Mo-Ni or Fe-Cu-Ni-Cr-Mo alloy.

When the core shaft is thus heated, the heat insulating layer 18 is retained at its temperature at the outer periphery of the core shaft to maintain the internal heating temperature, and zirconium ceramic heat insulating layer 18 is retained at 100° to 200° C. upon irradiation of the far infrared rays in the heating unit 32.

On the other hand, the piece 25 is externally heated by the inside and outside heating tubes 41 and 42 in each heating zone of the heating unit 32. For example, the first zone is heated to 140° to 160° C., the second zone to 160° to 180° C., the third zone to 180° to 220° C., and the fourth zone to 160° to 200° C. The temperature in each zone is detected by the thermostat 47 to allow the control unit 48 and the driving device 46 to control the temperature by opening or closing the damper 44.

After entering the heating unit 32, the piece 25 thus uniformly internally and externally heated therein is advanced toward the exit of the heating unit 32 while being rotated by the rotation of the core metal 39, and is set in the mold (not shown) of the blow-molding machine 30 by the loader 37. The core shaft 15 is protruded upwards in the mold to thereby longitudinally orient the piece 25, and compressed air is then fed through the air passages 21, 22, 23 of the core shaft to thereby laterally orient the piece 25 to thus blow-mold the piece into a bottle-shaped container. Then, the mold is opened, and the bottle-shaped container thus blow-molded is unloaded at the position of the unloader 31, and is fed with the jig 10 to the loader 34 so as to thus provide continuous operation.

It should be understood from the foregoing description that since the zirconium ceramic heat insulating material is coated on the core shaft in the jig used for the blow-molding machine of the present invention, it can absorb the heat generated upon irradiation of heat rays of special wavelengths such as far infrared rays to the jig to thereby internally heat the piece together with the external heat of the piece by the infrared ray or far infrared ray heating tubes in the heating unit to thus heat the piece to a temperature optimum for blow-molding the piece.

It should also be appreciated that since the high frequency induction heating unit is provided at the inlet of the heating unit of the blow-molding machine in the present invention, the core shaft can be heated inductively for short time to allow the heat insulating material to absorb the heat to thereby retain the piece at raised temperature so as to ideally internally heat the piece. It should be also noted that since the jig used for the blow-molding machine of the present invention employs the neck support, mandrel and core guide or the like to retain the piece in inverted neck portion attitude, it can smoothly execute the attachment of the piece to the core metal, supply of the piece from the heating unit to the blow-molding mold, biaxial orientation of the piece in the mold, and detachment of the piece from the mold to thereby fabricate a container of superior molding accuracy.

What is claimed is:

1. A device for heating an injection molded resin piece having a neck, prior to biaxial orientation blow molding, comprising:
    a rotary turntable;
    a cover disposed above and spaced from said turntable;
    a jig disposed at the periphery of said turntable, comprising:
        a neck support for holding the piece in neck portion downward position;
        a mandrel disposed beneath said neck support;
        an elevationally reciprocally movable core shaft inserted in said mandrel and extending through said neck support for longitudinally orienting the piece, having a blow-molding air-passage;
        a heat-insulating layer coated on the outer periphery of said core shaft;
        a plurality of infrared or far infrared ray heating elements disposed inside said cover in the vicinity of the periphery of the turntable, said insulating layer comprising material which will cause heating of the interior of the piece held by said jig due to heating of said insulating layer by special wavelength rays of said heating elements upon irradiation of said heating elements.

2. A device according to claim 1, further comprising a core guide made of refractory synthetic resin disposed in the neck support.

3. A device according to claim 1, wherein said neck support is disposed above a heat-insulating plate provided on the top of said mandrel, and said core shaft further comprises a core top made of heat-insulating material having an inverted taper shape or spherical shape for stopping the heat conduction to and from the piece and for preventing the piece from sticking onto the core shaft when it is subjected to the longitudinal orientation.

4. A device according to claim 1, wherein said core shaft is made of iron alloy, and said device further comprises a high frequency induction heater for heating said core shaft.

5. A device according to claim 1, wherein said heat-insulating layer is made of zirconium ceramic.

* * * * *